Feb. 16, 1937.  C. R. PARKER  2,071,174
MULTIPLE HOSE REEL
Filed Sept. 17, 1935   2 Sheets-Sheet 1
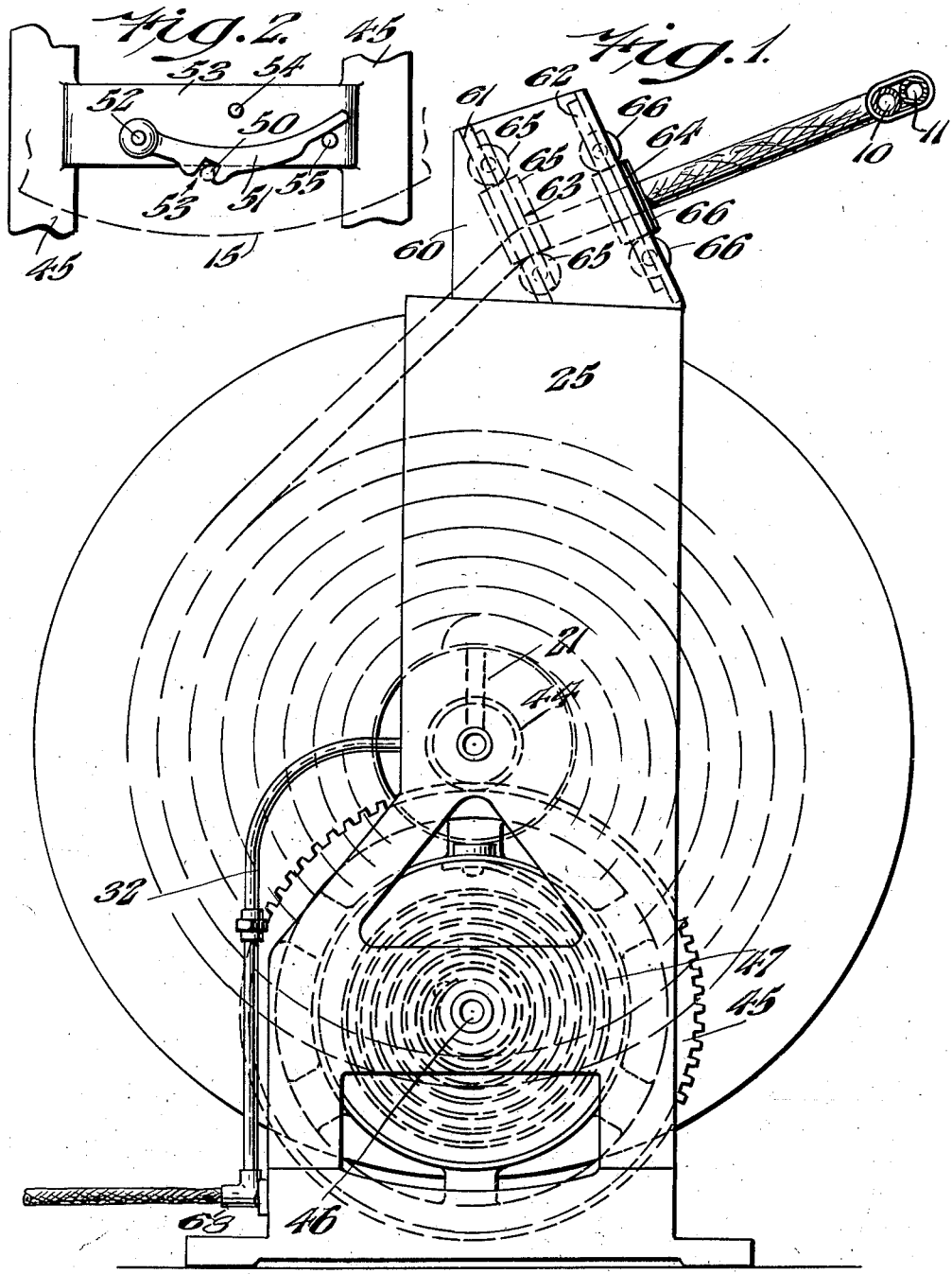
INVENTOR
Charles R. Parker,
BY
Robert M. Barr
ATTORNEY

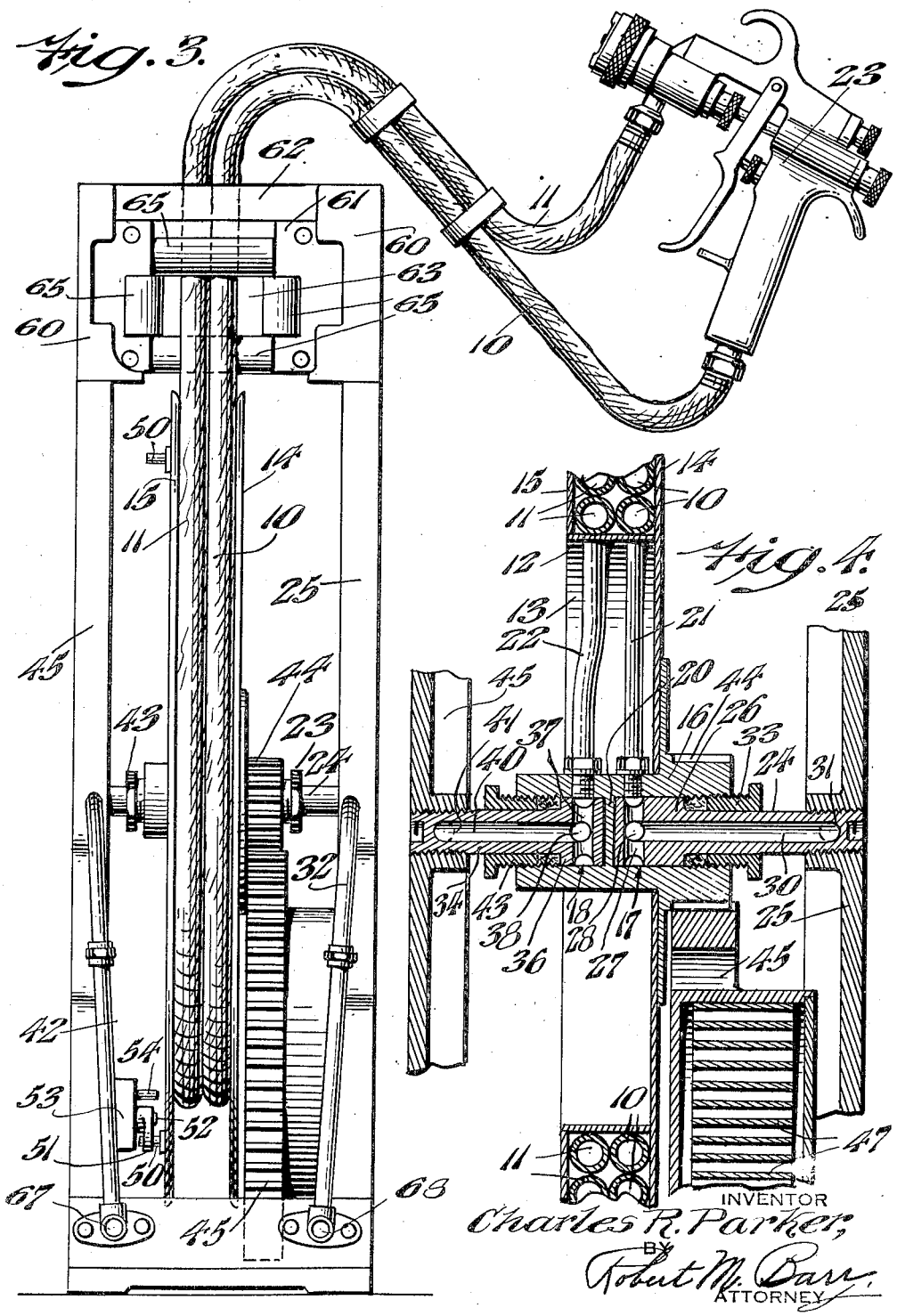

Patented Feb. 16, 1937

2,071,174

UNITED STATES PATENT OFFICE 2,071,174

MULTIPLE HOSE REEL

Charles R. Parker, Philadelphia, Pa., assignor to Wirt & Knox Mfg. Co., Philadelphia, Pa., a corporation of New Jersey Application September 17, 1935, Serial No. 40,907

2 Claims. (Cl. 299—78)

The present invention relates to hose reels and more particularly to a retractile reel carrying two separate lengths of hose.

In the art of spray painting, for example, it has been the practice heretofore to use two lines of hose, one carrying paint under pressure and the other air under pressure with the result that as the position of the operator changes from one point to another the length of hose in use varies. Thus when such operator works for a time at a point remote from the two sources of supply and then changes to a point much nearer such sources, the two lengths of hose spread over the floor to get in the way of the operator or others, and form coils which tangle one with another to obstruct the free flow of the paint or other material.

Some of the objects of the present invention are to provide an improved hose reel of the self-retracting type; to provide a hose reel wherein provision is made for reeling two lengths of hose and supplying each hose from a different source of liquid, air or other medium to be discharged; to provide a novel reel guide mechanism for permitting a hose to be wound or unwound with a minimum of friction and without danger of kinking, binding or breaking; and to provide other improvements as will hereinafter appear.

In the accompanying drawings Fig. 1 represents a side elevation of a hose reel embodying one form of the present invention; Fig. 2 represents a detail of a releasable latch mechanism associated with the reel; Fig. 3 represents an end elevation of the reel of the present invention; and Fig. 4 represents a sectional detail of parts including the reel hub and inlets for the medium supplied to the hose lines.

Referring to the drawings one form of the present invention consists of two lengths of hose 10 and 11 which in assembled or reeled condition are wound side by side on the periphery 12 of a reel 13 and there held in position by the walls 14 and 15 of the aforesaid reel. In the present instance the wall 14 is made fast in any suitable manner to a hub 16 having axially disposed bores 17 and 18 entering respectively from opposite ends and separated by a substantially centrally disposed partition 20. The bore 17 is in communication with a pipe 21 which connects with the inner end of the hose 10, while the bore 18 is in communication with a pipe 22 which connects with the inner end of the hose 11. By this arrangement it is possible to supply two liquids, gases, or other medium under pressure simultaneously to the two lengths of hose 10 and 11 for discharge purposes. As here shown air under pressure is supplied to the hose 10 and liquid paint is supplied to the hose 11, the two mediums being discharged under the control of a spray gun 23 of any well known construction.

In order to introduce air under pressure into the bore 17 and pipe 21 without leakage while the hub 16 is rotating, an axle member 24 has threaded engagement at one end with a support standard 25, while its opposite end terminates in a head 26 having a circumferential groove 27. The assembly of the parts is such that the groove 27 is always in register with the inlet to the pipe 21. This groove 27 communicates by a radially disposed opening 28 with a port 30 which extends axially of the member 24, and communicates in the present instance by way of a port 31 in the standard 25 with an air supply pipe 32. A suitable stuffing box 33 prevents leakage between the movable hub 16 and the head 26.

In order to introduce paint under pressure into the bore 18 and pipe 22 without leakage while the hub 16 is rotating, an axle member 34 has threaded engagement at one end with a support standard 35, while its opposite end terminates in a head 36 having a circumferential groove 37. The assembly of the parts is such that the groove 37 is always in register with the inlet to the pipe 22. This groove 37 communicates by a radially disposed opening 38 with a port 40 which extends axially of the member 34 and communicates, in the present instance, by way of a port 41 in the standard 35 with the paint supply pipe 42. A suitable stuffing box 43 prevents leakage between the movable hub 16 and the head 36.

For the purpose of automatically retrieving the hose when released after use, the hub 16 is provided with a pinion 44 meshing with a gear 45 which is rotatably mounted on a shaft 46 suitably journalled in the standards 25 and 45. A spirally coiled spring 47 secured in a well known manner between the shaft 46 and gear 45 serves to return the latter from any displaced position. Preferably it is desirable to relieve the operator of the tension of the spring 47 while using the hose and to that end the wall or side plate 15 of the reel is provided with one or more laterally disposed pins 50 so positioned as to travel in a path to intercept a gravity controlled latch 51. This latch 51 is pivoted at 52 to a cross brace 53 of the standard 45 and has a notch 53 for seating any pin 50 which lifts the latch as the reel unwinds. Stop pins 54 and 55 retain the latch within operating limits. Preferably there are three pins 50 spaced at such intervals as will allow two or three feet of hose removed between latching action.

In order that the hose can be drawn freely from the reel without catching, kinking or otherwise obstructing its free running in both directions, plate extensions 60 are supported on the top of the standards 25 and 45, and carry between them two transversely disposed guide frames 61 and 62 provided respectively with hose outlets 63 and 64 of generally rectangular shape. The bounding walls of these outlets are formed by anti-friction rollers 65 and 66 properly journalled in the frames so that in all operating directions of the hose it will ride over a movable surface of curved contour, thus eliminating binding as well as strains tending to damage the hose fabric.

The inlet ends of the pipes 32 and 42 terminate respectively in fittings 67 and 68 to which the two sources of supply medium are connected as will be understood.

While only a single form is shown in which this invention may be embodied, it is to be understood that the invention is not limited to any specific construction, but might be applied to various forms without departing from the spirit of the invention or the scope of the appended claims.

Having thus described my invention, I claim:—

1. In a hose reel apparatus, a reel member arranged to receive two lengths of hose thereon in side by side relation, a hub for said reel member having two passages therein, means forming a communication between one passage and one hose, means forming a communication between the second passage and the second hose, two supports respectively in said passages for mounting said hub for rotation, and means for respectively delivering fluids under pressure through said supports to said passages.

2. In a hose reel apparatus, a reel member arranged to receive two lengths of hose in side by side relation, a hub having two axially disposed passages respectively at opposite ends of said hub, two radially disposed pipes communicating through said hub respectively with said passages, one pipe communicating with one hose and the other with the other hose, a tubular member in one passage having a circumferential groove communicating with one pipe, a tubular member in the second passage having a circumferential groove communicating with the second pipe, means for respectively preventing leakage from said passages, supports respectively mounting said members, and means for respectively delivering fluids under pressure to said tubular members.

CHARLES R. PARKER.